(12) United States Patent
Ryuzaki et al.

(10) Patent No.: US 10,760,629 B2
(45) Date of Patent: Sep. 1, 2020

(54) CLUTCH CONTROL APPARATUS

(71) Applicant: HONDA MOTOR CO., LTD., Minato-ku, Tokyo (JP)

(72) Inventors: Tatsuya Ryuzaki, Wako (JP); Junya Ono, Wako (JP); Takashi Ozeki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/223,255

(22) Filed: Dec. 18, 2018

(65) Prior Publication Data

US 2019/0203783 A1 Jul. 4, 2019

(30) Foreign Application Priority Data

Dec. 28, 2017 (JP) ................. 2017-254248

(51) Int. Cl.
  *F16D 48/06* (2006.01)
  *F16H 63/46* (2006.01)
  *F16D 48/02* (2006.01)

(52) U.S. Cl.
  CPC .......... *F16D 48/066* (2013.01); *F16D 48/02* (2013.01); *F16D 48/06* (2013.01); *F16H 63/46* (2013.01); *F16D 2500/1026* (2013.01); *F16D 2500/1045* (2013.01); *F16D 2500/10412* (2013.01); *F16D 2500/1117* (2013.01); *F16D 2500/3067* (2013.01); *F16D 2500/30806* (2013.01); *F16D 2500/31466* (2013.01); *F16D 2500/5046* (2013.01); *F16D 2500/50287* (2013.01); *F16D 2500/7044* (2013.01); *F16D 2500/70406* (2013.01)

(58) Field of Classification Search
  CPC ........ F16D 48/02; F16D 48/06; F16D 48/066; F16D 2500/1026; F16D 2500/10412; F16D 2500/1045; F16D 2500/1117; F16D 2500/3067; F16D 2500/30806; F16D 2500/31466; F16D 2500/50287; F16D 2500/5046; F16D 2500/70406; F16D 2500/7044
  See application file for complete search history.

(56) References Cited

FOREIGN PATENT DOCUMENTS

| CN | 102947623 | 2/2013 |
|---|---|---|
| DE | 102004010269 | 9/2005 |
| EP | 2947355 | 11/2015 |
| GB | 2302927 | 2/1997 |
| JP | 60-139960 | 7/1985 |

OTHER PUBLICATIONS

Extended European Search Report for European Patent Application No. 18213811.5 dated Jun. 13, 2019.
Chinese Office Action for Chinese Patent Application No. 201811579543.8 dated Mar. 31, 2020.

*Primary Examiner* — Huan Le
(74) *Attorney, Agent, or Firm* — Amin, Turocy & Watson, LLP

(57) ABSTRACT

A clutch control device includes an engine, a gearbox, a clutch device configured to disconnect and connect power transmission between the engine and the gearbox, a clutch actuator configured to drive the clutch device and vary a clutch capacity, and an ECU configured to calculate a control target value of the clutch capacity, and the ECU determines whether an engine rotational number after downshifting by the gearbox enters a high rotation region and decreases the clutch capacity after downshifting when it is determined that the engine rotational number after downshifting enters the high rotation region.

6 Claims, 10 Drawing Sheets

FIG. 9

| | | | | ENGINE ROTATIONAL NUMBER[rpm] | | | | | | |
|---|---|---|---|---|---|---|---|---|---|---|
| | | r1 | r2 | r3 | r4 | r5 | r6 | r7 | r8 | r9 | r10 |
| THROTTLE OPENING ANGLE [%] | t1 | -q1 | -q2 | -q3 | -q4 | -q5 | -q6 | -q7 | -q8 | -q9 | -q10 |
| | t2 | q1 | q1 | -q2 | -q3 | -q4 | -q5 | -q6 | -q7 | -q8 | -q9 |
| | t3 | q2 | q2 | q1 | -q2 | -q3 | -q4 | -q5 | -q6 | -q7 | -q8 |
| | t4 | q3 | q3 | q2 | q1 | q1 | -q3 | -q4 | -q5 | -q6 | -q7 |
| | t5 | q4 | q4 | q3 | q2 | q2 | q1 | q1 | q1 | -q5 | -q6 |
| | t6 | q5 | q5 | q4 | q3 | q3 | q2 | q2 | q2 | q1 | q1 |
| | t7 | q6 | q6 | q5 | q4 | q4 | q3 | q3 | q3 | q2 | q2 |
| | t8 | q7 | q7 | q6 | q5 | q5 | q4 | q4 | q4 | q3 | q3 |
| | t9 | q8 | q8 | q7 | q6 | q6 | q5 | q5 | q5 | q4 | q4 |
| | t10 | q9 | q9 | q8 | q7 | q7 | q6 | q6 | q6 | q5 | q5 | though of downshifting is not allowed when an engine rotational
CLUTCH CONTROL APPARATUS

CROSS-REFERENCE TO RELATED APPLICATION

Priority is claimed on Japanese Patent Application No. 2017-254248, filed Dec. 28, 2017, the content of which is incorporated herein by reference.

BACKGROUND OF THE INVENTION

Field of the Invention

The present invention relates to a clutch control device.

Description of Related Art

In the related art, a configuration including a clutch device configured to disconnect and connect power transmission between an engine and a gearbox is known (for example, see Japanese Unexamined Patent Application, First Publication No. S60-139960).

Japanese Unexamined Patent Application, First Publication No. S60-139960 discloses control of allowing downshifting to be performed when an engine rotational number is smaller than a predetermined high rotational number. Accordingly, over revolution (ultrahigh speed rotation) after downshifting is prevented.

SUMMARY OF THE INVENTION

However, in control of the related art, since performance of downshifting is not allowed when an engine rotational number is a predetermined high rotational number or more, it may be impossible for a driver to perform downshifting at a desired timing.

An aspect of the present invention is directed to performing downshifting at a desired timing while preventing over revolution after the downshifting in a clutch control device.

(1) A clutch control device according to an aspect of the present invention includes an engine; a gearbox; a clutch device configured to disconnect and connect power transmission between the engine and the gearbox; a clutch actuator configured to drive the clutch device and vary a clutch capacity; and a controller configured to calculate a control target value of the clutch capacity, wherein the controller determines whether an engine rotational number after downshifting with the gearbox has entered a high rotation region, and decreases the clutch capacity after downshifting when it is determined that the engine rotational number after downshifting enters a high rotation region.

(2) In the aspect of above mentioned (1), the controller may determine whether a differential value between a threshold value of the high rotation region and an engine rotational number enters a predetermined value range, and decrease the clutch capacity after downshifting when it is determined that the differential value enters the predetermined value range.

(3) In the aspect of above mentioned (1) or (2), the controller may set the clutch capacity such that a torque substantially same to a friction torque of the engine is transmitted.

(4) In the aspect of any one of above mentioned (1) to (3), the clutch capacity may be controlled with a hydraulic pressure.

(5) In the aspect of above mentioned (4), the clutch capacity may be decreased and the clutch device (26) may be disconnected as a hydraulic pressure is lowered.

According to the aspect of above mentioned (1), it is possible to suppress the engine rotational number to enter or going beyond a red zone even after the downshifting is performed by decreasing the clutch capacity after downshifting when it is determined that the engine rotational number after downshifting enters the high rotation region. In addition, even when it is determined that the engine rotational number after downshifting enters the high rotation region, since the control of not allowing execution of downshifting is not performed, a driver can perform the downshifting at a desired timing. Accordingly, the downshifting can be performed at a desired timing while preventing over revolution after the downshifting.

According to the aspect of above mentioned (2), when the controller determines that a differential value between a threshold value of the high rotation region and the engine rotational number enters a predetermined value range, it is possible to suppress the engine rotational number after downshifting from entering or exceeding the red zone by decreasing a clutch capacity after downshifting.

According to the aspect of above mentioned (3), since the controller sets a clutch capacity such that a torque substantially same to a friction torque of the engine is transmitted, an appropriate traveling feeling can be experienced without causing a driver to experience an idling running feeling.

According to the aspects of above mentioned (4) and (5), a transmission delay of a driving force between the clutch actuator and the clutch device due to a resistance to flow (pressure loss) of a hydraulic pressure can be minimized since the clutch capacity is controlled with a hydraulic pressure.

BRIEF DESCRIPTION OF THE DRAWINGS

FIG. 9 is a view showing an engine estimation torque map according to the embodiment.

DETAILED DESCRIPTION OF THE INVENTION

Figure 1:
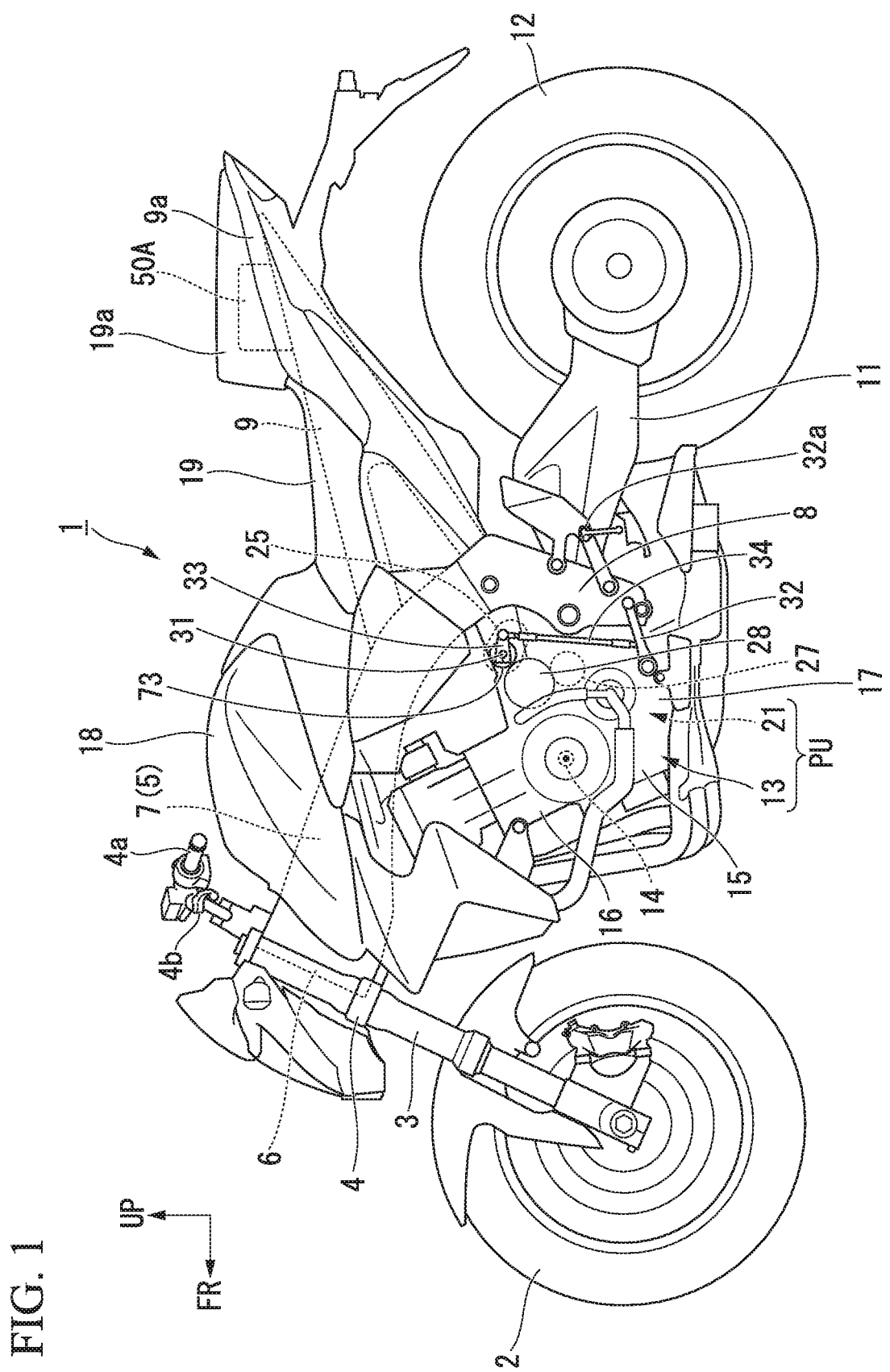
FIG. 1 is a left side view of a motorcycle according to an embodiment.

Hereinafter, an embodiment of the present invention will be described with reference to the accompanying drawings. Further, directions of forward, rearward, leftward, rightward, and so on, in the following description are the same as directions in a vehicle described below unless the context clearly indicates otherwise. In addition, in appropriate places in the drawings used in the following description, an arrow FR indicates a forward direction with respect to a vehicle, an arrow LH indicates a leftward direction with respect to the vehicle, and an arrow UP indicates an upward direction with respect to the vehicle.

<Entire Vehicle>

As shown in FIG. 1, the embodiment is applied to a motorcycle 1 that is a saddle riding vehicle. A front wheel 2 of the motorcycle 1 is supported by lower end portions of a pair of left and right front forks 3.

Upper sections of the left and right front forks 3 are supported by a head pipe 6, which is a front end portion of a vehicle body frame 5, via a steering stem 4. A bar type steering handle 4a is attached to a top bridge of the steering stem 4.

The vehicle body frame 5 includes the head pipe 6, main tubes 7 extending downward and rearward from the head pipe 6 at a center in a vehicle width direction (a leftward and rightward direction), left and right pivot frames 8 that are connected to the lower sides of rear end portions of the main tubes 7, and a seat frame 9 that is connected to rear sides of the main tubes 7 and the left and right pivot frames 8. A front end portion of a swing arm 11 is swingably supported by the left and right pivot frames 8. A rear wheel 12 of the motorcycle 1 is supported by a rear end portion of the swing arm 11.

A fuel tank 18 is supported above the left and right main tubes 7. A front seat 19 and a rear seat cover 19a that are disposed in a forward and rearward direction are supported behind the fuel tank 18 and above the seat frame 9. The surroundings of the seat frame 9 are covered with a rear cowl 9a.

A power unit PU that is a prime mover of the motorcycle 1 is suspended below the left and right main tubes 7. For example, the power unit PU is linked to the rear wheel 12 via a chain type transmission mechanism.

The power unit PU integrally has a gearbox 21 disposed at a rear side thereof and an engine (an internal combustion engine) 13 disposed at a front side thereof. The engine 13 is, for example, a multiple-cylinder engine in which a rotation axis of a crankshaft 14 (hereinafter, also referred to as "a crank shaft 14") is in the leftward and rightward direction (the vehicle width direction). In the engine 13, a cylinder 16 stands up at a front upper side of a crankcase 15. A rear section of the crankcase 15 is made as a gearbox case 17 that accommodates the gearbox 21.

<Gearbox>

Figure 2:
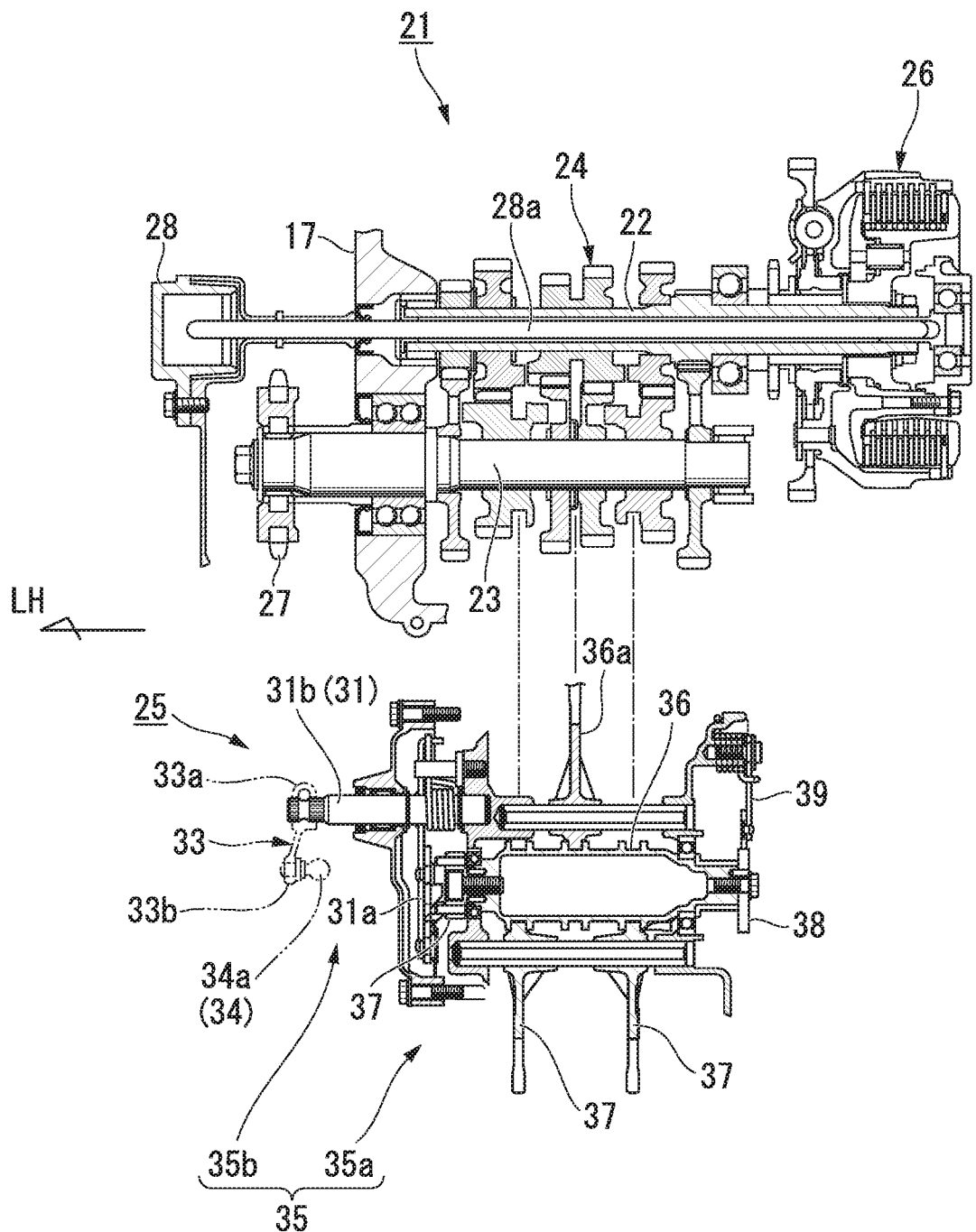
FIG. 2 is a cross-sectional view of a gearbox and a change mechanism of the motorcycle according to the embodiment.

As shown in FIG. 2, the gearbox 21 is a stepped transmission having a main shaft 22, a counter shaft 23, and a shifting gear group 24 that bridges between both of the shafts 22 and 23. The counter shaft 23 (hereinafter, also referred to as "the countershaft 23") constitutes output shafts of the gearbox 21 and the power unit PU. An end portion of the counter shaft 23 protrudes leftward from a rear left side of the crankcase 15, and is connected to the rear wheel 12 via the chain type transmission mechanism.

The shifting gear group 24 has gears corresponding to the number of variable speed levels supported by the shafts 22 and 23. The gearbox 21 is of a constant mesh type in which gear pairs to which the shifting gear group 24 corresponds are normally meshed between the shafts 22 and 23. A plurality of gears supported by the shafts 22 and 23 are classified into a free gear that is rotatable with respect to a corresponding shaft, and a slide gear (a shifter) spline-fitted to a corresponding shaft. A convex dog is formed on one of the free gear and the slide gear in an axial direction, and a concave slot is formed in the other gear in the axial direction such that the dog is engaged with the slot. That is, the gearbox 21 is a so-called dog mission.

Referring also to FIG. 1, the main shaft 22 and the counter shaft 23 of the gearbox 21 are disposed behind the crankshaft 14 in the forward and rearward direction. A clutch device 26 operated by a clutch actuator 50 is disposed at a right end portion of the main shaft 22 while being coaxial with the main shaft 22. The clutch device 26 is, for example, a wet multiplate clutch that is a so-called normally open clutch. That is, the clutch device 26 is in a connection state in which power transmission is possible due to supply of a hydraulic pressure from the clutch actuator 50, and returns to a disconnection state in which power transmission is not possible when there is no supply of a hydraulic pressure from the clutch actuator 50.

Referring to FIG. 2, the rotary power of the crankshaft 14 is transmitted to the main shaft 22 via the clutch device 26, and transmitted from the main shaft 22 to the counter shaft 23 via an arbitrary gear pair of the shifting gear group 24. A drive sprocket 27 of the chain type transmission mechanism is attached to a left end portion of the counter shaft 23 protruding toward a rear left side of the crankcase 15.

A change mechanism 25 configured to switch a gear pair of the shifting gear group 24 is accommodated in the gearbox 21 on a rear upper side thereof. The change mechanism 25 operates a plurality of shift forks 36a according to a pattern of lead grooves formed in an outer circumference thereof due to rotation of a hollow cylindrical shift drum 36 parallel to both of the shafts 22 and 23, and switches a gear pair of the shifting gear group 24 used for power transmission between the shafts 22 and 23.

The change mechanism 25 has a shift spindle 31 parallel to the shift drum 36.

Upon rotation of the shift spindle 31, a shift arm 31a fixed to the shift spindle 31 rotates the shift drum 36 and moves the shift forks 36a according to a pattern of the lead grooves in the axial direction, and the change mechanism 25 switches a gear pair that enables power transmission in the shifting gear group 24 (i.e., a variable speed level is switched).

The shift spindle 31 has a shaft outer portion 31b protruding outward (leftward) from the crankcase 15 in the vehicle width direction such that the change mechanism 25 is operable. A shift load sensor 73 (a shift operation detection means) is attached to the shaft outer portion 31b of the shift spindle 31 (see FIG. 1) so as to be coaxial with the shift spindle 31. A swing lever 33 is attached to the shaft outer portion 31b of the shift spindle 31 (or a rotation axis of the shift load sensor 73). The swing lever 33 extends rearward from a base end portion 33a fixed to the shift spindle 31 (or a rotation axis) using a clamp, and an upper end portion of a link rod 34 is swingably connected to a tip portion 33b of the swing lever 33 via an upper ball joint 34a. A lower end portion of the link rod 34 is swingably connected to a shift pedal 32 that is operated by a driver's foot via a lower ball joint (not shown).

As shown in FIG. 1, the shift pedal 32 has a front end portion that is vertically swingably supported by a lower section of the crankcase 15 via a shaft in the leftward and rightward direction. A pedal section on which a tip of a driver's foot placed on a step 32a is put is installed on a rear end portion of the shift pedal 32, and a lower end portion of the link rod 34 is connected to an intermediate section of the shift pedal 32 in the forward and rearward direction.

As shown in FIG. 2, a shift change apparatus 35 including the shift pedal 32, the link rod 34 and the change mechanism 25 and configured to switch a variable speed level gear of the gearbox 21 is provided. In the shift change apparatus 35, an assembly (the shift drum 36, the shift forks 36a, and so on) configured to switch a variable speed level of the gearbox 21 is referred to as a gear shift operation section 35a, and the assembly (the shift spindle 31, the shift arm 31a, and so on) into which a gear shift operation to the shift pedal 32 is input and configured to rotate about an axis of the shift spindle 31 and transmit the rotation to the gear shift operation section 35a is referred to as a gear shift operation receiving section 35b.

Here, the motorcycle 1 employs a so-called semi-automatic gear shift system (an automatic clutch type gear shift system) in which a driver performs only a gear shift operation of the gearbox 21 (a foot operation of the shift pedal 32), and a disconnection and connection operation of the clutch device 26 is automatically performed through electrical control according to an operation of the shift pedal 32.

<Gear Shift System>

Figure 4:
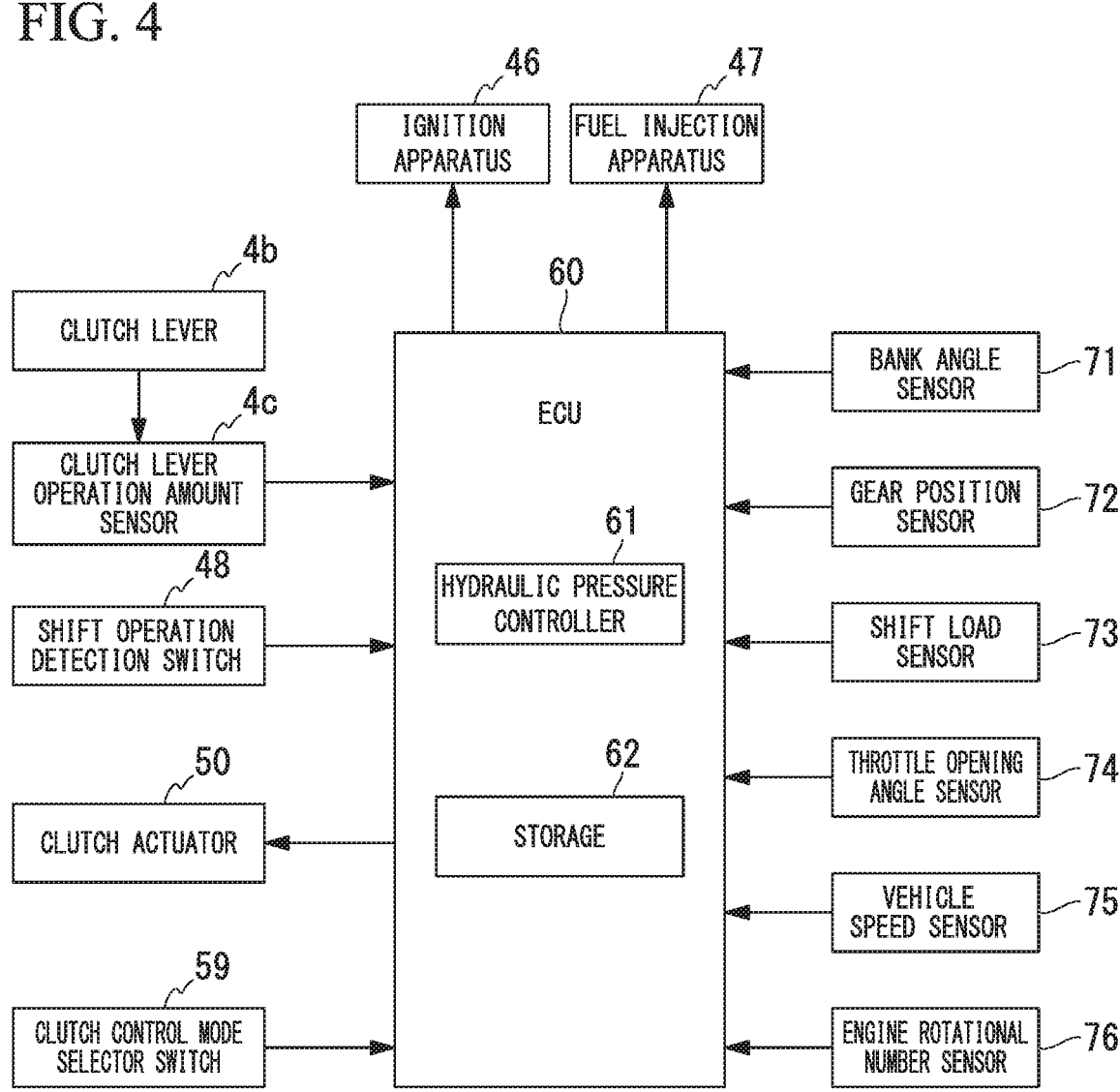
FIG. 4 is a block diagram of a gear shift system.

As shown in FIG. 4, the gear shift system includes the clutch actuator 50, an electronic control unit 60 (ECU, a control device) and various sensors 71 to 76.

The ECU 60 controls operations of an ignition apparatus 46 and a fuel injection apparatus 47 while controlling an operation of the clutch actuator 50 on the basis of detection information from a bank angle sensor 71 configured to detect a bank angle of a vehicle body, a gear position sensor 72 configured to detect a variable speed level from a rotation angle of the shift drum 36, and the shift load sensor 73 (for example, a torque sensor) configured to detect an operation torque input to the shift spindle 31, and various types of vehicle state detection information or the like from a throttle opening angle sensor 74 configured to detect a throttle opening angle, a vehicle speed sensor 75, an engine rotational number sensor 76 configured to detect an engine rotational number, and so on. Detection information from hydraulic pressure sensors 57 and 58, and a shift operation detection switch (a shift neutral switch) 48, which will be described below, is input to the ECU 60.

In addition, the ECU 60 includes a hydraulic pressure controller (a clutch controller) 61 and a storage 62, functions of which will be described below.

Figure 3:
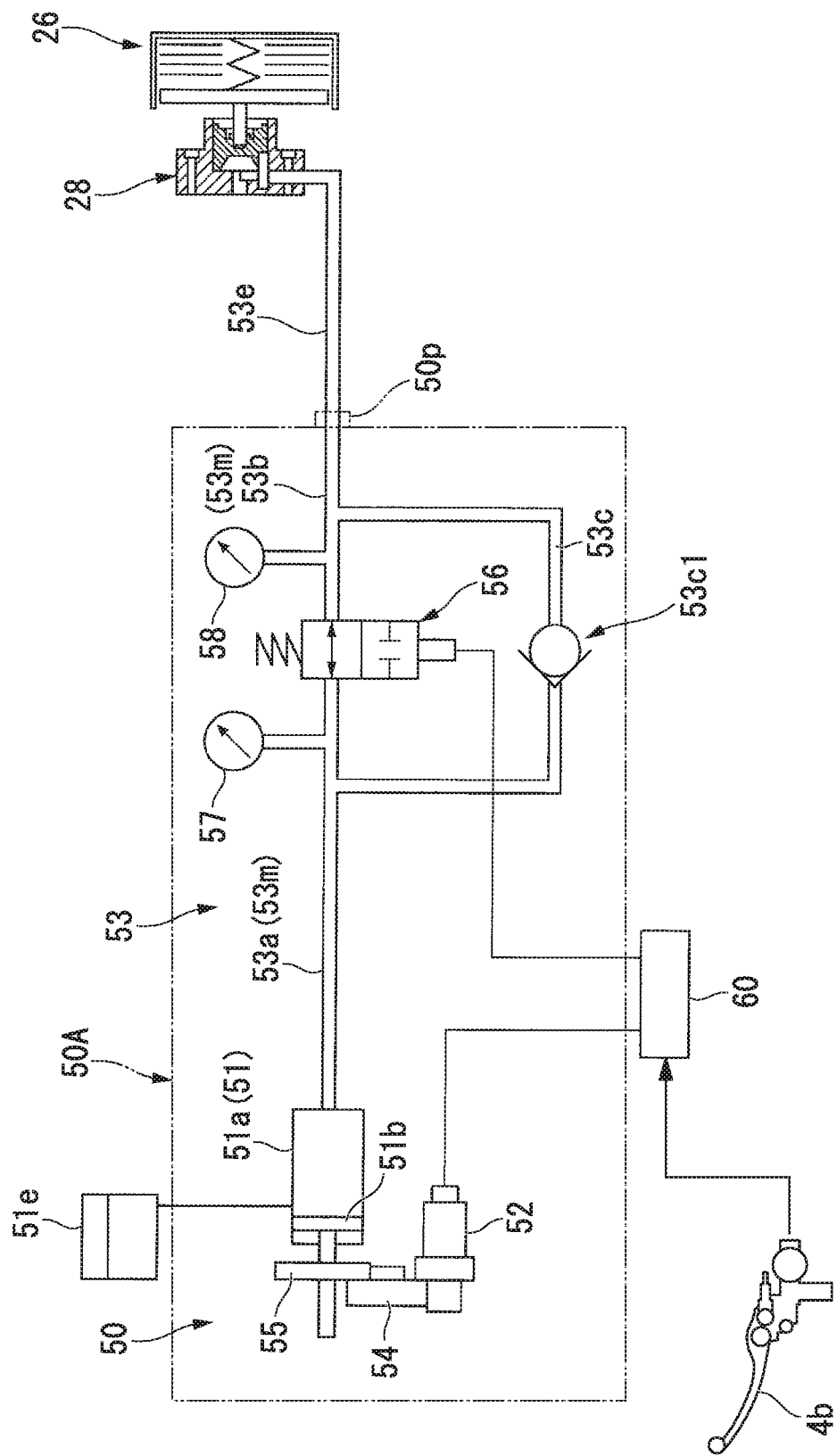
FIG. 3 is a view schematically illustrating a clutch operation system including a clutch actuator.

Referring also to FIG. 3, the clutch actuator 50 can control a hydraulic pressure that disconnects and connects the clutch device 26 by controlling an operation thereof using the ECU 60. The clutch actuator 50 includes an electric motor 52 (hereinafter, simply referred to as "a motor 52") serving as a drive source, and a master cylinder 51 driven by the motor 52. The clutch actuator 50 constitutes an integrated clutch controller 50A together with a hydraulic pressure circuit apparatus 53 installed between the master cylinder 51 and a hydraulic pressure supply and discharge port 50p.

The ECU 60 calculates a target value (a target hydraulic pressure) of a hydraulic pressure supplied to a slave cylinder 28 for disconnecting and connecting the clutch device 26 on the basis of a preset calculation program, and controls the clutch controller 50A such that a hydraulic pressure (a slave hydraulic pressure) on the side of the slave cylinder 28 detected by the downstream-side hydraulic pressure sensor 58 approaches a target hydraulic pressure.

The master cylinder 51 can cause stroking of a piston 51b in a cylinder main body 51a through driving of the motor 52, and supply and discharge working oil in the cylinder main body 51a to and from the slave cylinder 28. Reference numeral 55 in the drawings designates a ball screw mechanism serving as a conversion mechanism, reference numeral 54 designates a transmission mechanism that bridges between the motor 52 and the conversion mechanism 55, and reference numeral 51e designates a reservoir connected to the master cylinder 51.

The hydraulic pressure circuit apparatus 53 has a valve mechanism (a solenoid valve 56) configured to open or block an intermediate area of a main oil path (a hydraulic pressure supply and discharge oil path) 53m extending from the master cylinder 51 toward the clutch device 26 (the slave cylinder 28). The main oil path 53m of the hydraulic pressure circuit apparatus 53 is divided into an upstream side oil path 53a which is on the master cylinder 51 side of the solenoid valve 56 and a downstream side oil path 53b which is on the slave cylinder 28 side of the solenoid valve 56. The hydraulic pressure circuit apparatus 53 further includes a bypass oil path 53c configured to bypass the solenoid valve 56 and to communicate the upstream side oil path 53a and the downstream side oil path 53b with each other.

The solenoid valve 56 is a so-called normally open valve. A one-way valve 53c1 configured to allow working oil to flow only in a direction from an upstream side to a downstream side is installed in the bypass oil path 53c. The upstream-side hydraulic pressure sensor 57 configured to detect a hydraulic pressure of the upstream side oil path 53a is installed upstream from the solenoid valve 56. The downstream-side hydraulic pressure sensor 58 configured to detect a hydraulic pressure of the downstream side oil path 53b is installed downstream from the solenoid valve 56.

As shown in FIG. 1, the clutch controller 50A is accommodated in, for example, the rear cowl 9a. The slave cylinder 28 is attached to a rear left side of the crankcase 15. The clutch controller 50A and the slave cylinder 28 are connected to each other via a hydraulic pressure pipeline 53e (see FIG. 3).

As shown in FIG. 2, the slave cylinder 28 is disposed coaxially with the main shaft 22 on a left side thereof. The slave cylinder 28 presses a push rod 28a passing through the main shaft 22 rightward when a hydraulic pressure from the clutch actuator 50 is supplied. The slave cylinder 28 operates the clutch device 26 via the push rod 28a by pressing the push rod 28a rightward such that the clutch device 26 is brought into a connection state. The slave cylinder 28 releases pressing of the push rod 28a and returns the clutch device 26 to a disconnection state when there is no supply of the hydraulic pressure.

While a hydraulic pressure needs to be continuously supplied to maintain the clutch device 26 in a connection state, electric power is correspondingly consumed. Here, as shown in FIG. 3, the solenoid valve 56 is installed in the hydraulic pressure circuit apparatus 53 of the clutch controller 50A, and the solenoid valve 56 is closed after supply of a hydraulic pressure toward the clutch device 26. Accordingly, energy consumption is minimized by a configuration of maintaining a hydraulic pressure supplied toward the clutch device 26 and supplementing the hydraulic pressure according to decrease in pressure (restoring a pressure according to an amount of leakage).

<Clutch Control>

Figure 5:
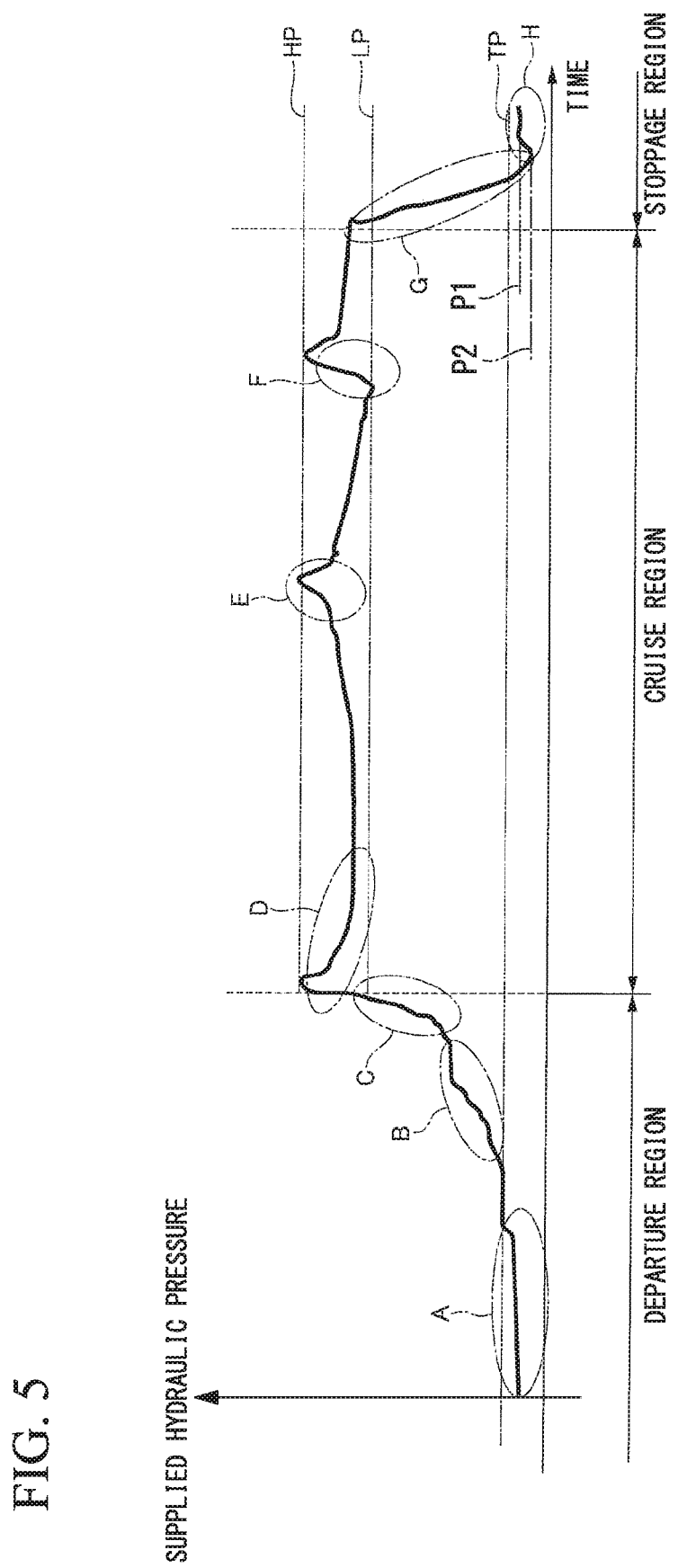
FIG. 5 is a graph showing variation of a supplied hydraulic pressure of a clutch actuator.

Next, an action of a clutch control system will be described with reference to a graph of FIG. 5. In the graph of FIG. 5, a vertical axis represents a supplied hydraulic pressure detected by the downstream-side hydraulic pressure sensor 58, and a horizontal axis represents an elapsed time.

Upon stoppage (upon idling) of the motorcycle 1, the solenoid valve 56 controlled by the ECU 60 is in a valve open state. Here, the slave cylinder 28 side (a downstream side) is in a state of having a pressure lower than a touch point hydraulic pressure TP, and the clutch device 26 is in a disengaged state (a disconnection state, a release state). This state corresponds to a region A in FIG. 5.

In a state in which the vehicle is stopped in an in-gear state, electric power is supplied to the motor 52, and a hydraulic pressure is slightly generated. This is because the clutch is continuously connected and the vehicle can depart immediately.

Upon departure of the motorcycle 1, when a rotational number of the engine 13 is increased, electric power is supplied only to the motor 52, and a hydraulic pressure is supplied from the master cylinder 51 to the slave cylinder 28 via the solenoid valve 56 in an open state. When a hydraulic pressure on a side of the slave cylinder 28 (a downstream side) is increased to the touch point hydraulic pressure TP or more, engagement of the clutch device 26 is started, and the clutch device 26 is in a half clutch state in which some of power can be transmitted. Accordingly, smooth departure of the motorcycle 1 becomes possible. This state corresponds to a region B in FIG. 5.

Then, when a difference between input rotation and output rotation of the clutch device 26 is reduced and a hydraulic pressure on a side of the slave cylinder 28 (the downstream side) reaches a lower limit holding hydraulic pressure LP, engagement of the clutch device 26 is shifted to a locked state, and a driving force of the engine 13 is entirely transmitted to the gearbox 21. This state corresponds to a region C in FIG. 5.

When a hydraulic pressure is supplied from the master cylinder 51 side toward the slave cylinder 28, the solenoid valve 56 is in an open state, the motor 52 is energized to drive in a normal rotation direction, and the master cylinder 51 is pressurized. Accordingly, a hydraulic pressure on a side of the slave cylinder 28 is adjusted to a clutch-engagement hydraulic pressure. Here, driving of the clutch actuator 50 is feedback-controlled on the basis of a detected hydraulic pressure of the downstream-side hydraulic pressure sensor 58.

Then, when a hydraulic pressure on the side of the slave cylinder 28 (the downstream side) reaches an upper limit holding hydraulic pressure HP, electric power is supplied to the solenoid valve 56 to close the solenoid valve 56, and simultaneously, supply of electric power to the motor 52 is stopped and generation of a hydraulic pressure is stopped. That is, while the upstream side is in a low pressure state since the hydraulic pressure has been released, the downstream side is maintained in a high pressure state (the upper limit holding hydraulic pressure HP). Accordingly, the clutch device 26 is maintained in an engaged state without generation of hydraulic pressure from the master cylinder 51, and electric power consumption can be minimized while enabling traveling of the motorcycle 1.

Here, depending on a gear shift operation, the clutch device 26 may be shifted immediately after inputting the hydraulic pressure. In this case, before the solenoid valve 56 is closed and the upstream side is in a low pressure state, the motor 52 is driven in a reverse direction while the solenoid valve 56 is open, a reservoir 51e is caused to communicate with the master cylinder 51 while the master cylinder 51 is decompressed, and a hydraulic pressure on the side of the clutch device 26 toward the master cylinder 51 is relieved. Here, driving of the clutch actuator 50 is feedback-controlled on the basis of a detected hydraulic pressure of the upstream-side hydraulic pressure sensor 57.

Even in a state in which the solenoid valve 56 is closed and the clutch device 26 is maintained in an engaged state, as shown in a region D in FIG. 5, a hydraulic pressure on the downstream side is gradually decreased (leaked). That is, a hydraulic pressure on the downstream side is gradually decreased due to causes such as a leakage of a hydraulic pressure or a decrease in temperature due to deformation or the like of seals of the solenoid valve 56 and the one-way valve 53c1.

Meanwhile, as shown in a region E in FIG. 5, a hydraulic pressure on the downstream side may be increased due to an increase in temperature or the like.

If there is fine hydraulic pressure fluctuation on the downstream side, the fine hydraulic pressure fluctuation can be absorbed by an accumulator (not shown), and it is not necessary to operate the motor 52 and the solenoid valve 56 every time when the hydraulic pressure fluctuates and to increase the electric power consumption.

As shown in the region E in FIG. 5, when a hydraulic pressure on the downstream side is increased to the upper limit holding hydraulic pressure HP, since supply of electric power to the solenoid valve 56 is decreased or the like, the solenoid valve 56 is brought into an open state in stages, and the hydraulic pressure on the downstream side toward the upstream side is relieved.

As shown in a region F in FIG. 5, when a hydraulic pressure on the downstream side is decreased to the lower limit holding hydraulic pressure LP, the supply of electric power to the motor 52 is started while the solenoid valve 56 is closed, and a hydraulic pressure on the upstream side is increased. When the hydraulic pressure on the upstream side exceeds the hydraulic pressure on the downstream side, the hydraulic pressure is supplemented (restored) on the downstream side via the bypass oil path 53c and the one-way valve 53c1. When the hydraulic pressure on the downstream side approaches the upper limit holding hydraulic pressure HP, supply of electric power to the motor 52 is stopped and generation of the hydraulic pressure is stopped. Accordingly, the hydraulic pressure on the downstream side is maintained between the upper limit holding hydraulic pressure HP and the lower limit holding hydraulic pressure LP, and the clutch device 26 is maintained in an engaged state.

When the gearbox 21 is at a neutral position upon stoppage of the motorcycle 1, supply of electric power to the motor 52 and the solenoid valve 56 is also stopped. Accordingly, the master cylinder 51 stops generation of a hydraulic pressure and stops supply of a hydraulic pressure to the slave cylinder 28. The solenoid valve 56 is in an open state, and a hydraulic pressure in the downstream side oil path 53b is returned to the reservoir 51e. As described above, the slave cylinder 28 side (the downstream side) is in a state of having a pressure lower than the touch point hydraulic pressure TP, and the clutch device 26 is in a disengaged state. This state corresponds to regions G and H in FIG. 5.

In a state in which the gearbox 21 is at a neutral position upon stoppage of the motorcycle 1, supply of electric power to the motor 52 is blocked and in a stoppage state. For this reason, the hydraulic pressure is in a state close to 0.

Meanwhile, if the gearbox 21 is in an in-gear state upon stoppage of the motorcycle 1, a standby state in which a standby hydraulic pressure WP is applied toward the slave cylinder 28 is established.

The standby hydraulic pressure WP is a hydraulic pressure that is slightly lower than the touch point hydraulic pressure TP at which connection of the clutch device 26 starts, and a hydraulic pressure (a hydraulic pressure applied to the regions A and H in FIG. 5) at which the clutch device 26 is not connected. Invalid stroke filling of the clutch device 26 (canceling out of rattling of individual parts or canceling out of a reaction force of an operation, application of pre-compression to a hydraulic path, and so on) becomes possible due to application of the standby hydraulic pressure WP, and working responsiveness upon connection of the clutch device 26 is increased.

<Shift Control>

Next, shift control of the motorcycle 1 will be described.

In the motorcycle 1 of the embodiment, in a state in which a gear position of the gearbox 21 is in a 1st in-gear state and an in-gear stoppage state in which a vehicle speed is less than a set value corresponding to stoppage, a control of decreasing the standby hydraulic pressure WP supplied to the slave cylinder 28 is performed when a shift operation from a 1st gear to a neutral position is performed with respect to the shift pedal 32.

Here, when the motorcycle 1 is in a stoppage state and a gear position of the gearbox 21 is disposed at any variable gear position other than the neutral position, i.e., when the gearbox 21 is in an in-gear stoppage state, the preset standby hydraulic pressure WP is supplied to the slave cylinder 28.

The standby hydraulic pressure WP is normally set to a first set value P1 (see FIG. 5) that is a standard standby hydraulic pressure (in a case of a non-detection state in which a gear shift operation of the shift pedal 32 is not detected). Accordingly, the clutch device 26 is in a standby state in which the invalid stroke filling is performed, and responsiveness upon clutch engagement is increased. That is, when a driver increases a throttle opening angle and increases a rotational number of the engine 13, immediate engagement of the clutch device 26 is started due to supply of a hydraulic pressure to the slave cylinder 28, and rapid departure acceleration of the motorcycle 1 becomes possible.

The motorcycle 1 includes a shift operation detection switch 48 separately from the shift load sensor 73 in order to detect a shift operation of a driver with respect to the shift pedal 32.

Then, in the in-gear stoppage state, when the shift operation detection switch 48 detects a shift operation from a 1st gear to a neutral position, the hydraulic pressure controller 61 performs control of setting the standby hydraulic pressure WP to a second set value P2 (a low pressure standby hydraulic pressure, see FIG. 5) which is lower than the first set value P1 before a gear shift operation is performed.

When the gearbox 21 is in an in-gear state, since a standard standby hydraulic pressure corresponding to the first set value P1 is normally supplied to the slave cylinder 28, a slight, so-called, drag will occur in the clutch device 26. Here, a dog and a slot (a dog hole) meshing with each other in a dog clutch of the gearbox 21 press each other in a rotational direction, and a resistance in engagement release occurs and a shift operation may become heavy. In this case, when the standby hydraulic pressure WP supplied to the slave cylinder 28 is lowered to a low pressure standby hydraulic pressure corresponding to the second set value P2, engagement of the dog and the slot becomes easy to release, and a shift operation becomes light.

<Clutch Control Mode>

Figure 6:
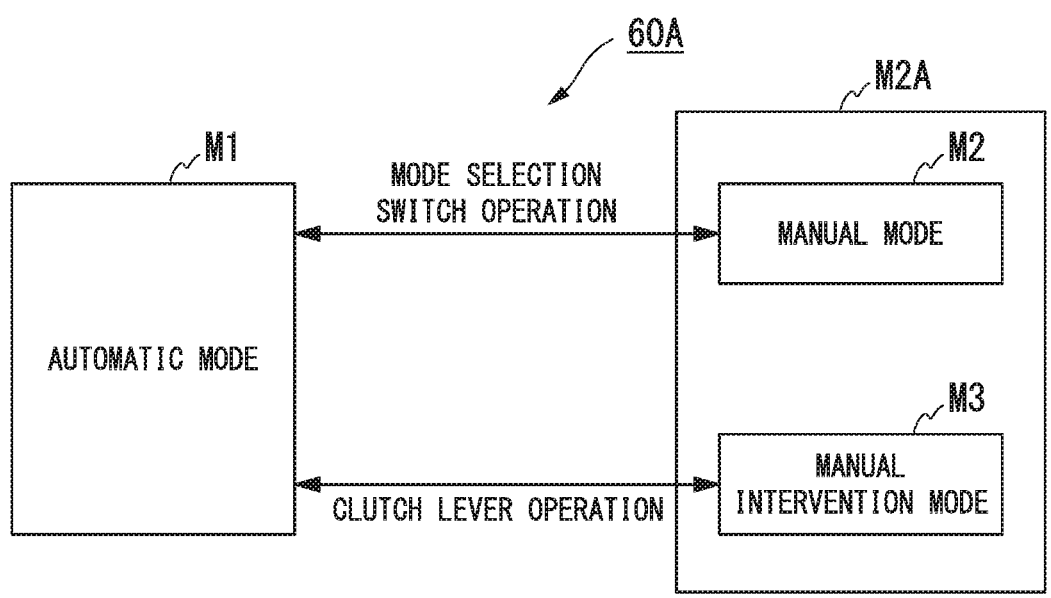
FIG. 6 is a view for illustrating shifting of a clutch control mode according to the embodiment.

As shown in FIG. 6, a clutch control device 60A of the embodiment has three types of clutch control modes. The clutch control modes are appropriately shifted between the three types modes including an automatic mode M1 of performing automated control, a manual mode M2 of performing a manual operation and a manual intervention mode M3 of performing a temporary manual operation according to operations of a clutch control mode selection switch 59 (see FIG. 4) and the clutch lever 4b (see FIG. 1). Further, an object including the manual mode M2 and the manual intervention mode M3 is referred to as a manual system M2A.

The automatic mode M1 is a mode of controlling the clutch device 26 by calculating a clutch capacity appropriate for a traveling state through automatic departure and shift control. The manual mode M2 is a mode of controlling the clutch device 26 by calculating a clutch capacity according to a clutch operation instruction from an occupant. The manual intervention mode M3 is a temporary manual operation mode of controlling the clutch device 26 by receiving a clutch operation instruction from an occupant during the automatic mode M1 and calculating a clutch capacity from the clutch operation instruction. Further, when an occupant stops (perfectly releases) an operation of a clutch lever 4b during the manual intervention mode M3, it is set so that the mode returns to the automatic mode M1.

The clutch control device 60A of the embodiment drives the clutch actuator 50 (see FIG. 3) and generates a clutch control hydraulic pressure. For this reason, the clutch control device 60A starts control from a clutch-off state (a disconnection state) in the automatic mode M1 upon starting of the system. In addition, the clutch control device 60A is set to return to the clutch-off in the automatic mode M1 since a clutch operation is unnecessary upon stoppage of the engine 13.

In the embodiment, the clutch control device 60A constitutes a clutch control system together with the clutch lever 4b.

The automatic mode M1 is basically to perform clutch control automatically, and allows the motorcycle 1 to travel with no lever operation. In the automatic mode M1, a clutch capacity is controlled by a throttle opening angle, an engine rotational number, a vehicle speed and a shift sensor output. Accordingly, the motorcycle 1 can be started without engine stall with only a throttle operation and can perform a gear-shift with only a shift operation. However, there is a case in which the clutch device 26 is automatically disconnected during an extremely low speed equivalent to idling. In addition, in the automatic mode M1, it is shifted to the manual intervention mode M3 by grasping the clutch lever 4b, and it is possible to arbitrarily disconnect the clutch device 26.

Meanwhile, in the manual mode M2, a clutch capacity is controlled according to a lever operation by an occupant. The automatic mode M1 and the manual mode M2 can be switched between by operating the clutch control mode selection switch 59 (see FIG. 4) during stoppage. Further, the clutch control device 60A may include an indicator indicating that a lever operation is effective upon shifting to the manual system M2A (the manual mode M2 or the manual intervention mode M3).

The manual mode M2 is basically to perform clutch control manually, and a clutch hydraulic pressure can be controlled according to an actuation angle of the clutch lever 4b. Accordingly, it is possible to control disconnection and connection of the clutch device 26 according to an intention of an occupant, and it is possible to connect the clutch device 26 to drive the motorcycle even at an extremely low speed equivalent to idling. However, an engine stall may occur depending on a lever operation, and automatic departure with a throttle operation only is also not possible. Further, even in the manual mode M2, clutch control is automatically intervened upon a shift operation.

While disconnection and connection of the clutch device 26 is performed automatically by the clutch actuator 50 in the automatic mode M1, it is possible to temporary intervene a manual operation during the automated control of the clutch device 26 by performing a manual clutch operation with respect to the clutch lever 4b (the manual intervention mode M3).

<Manual Clutch Operation>

As shown in FIG. 1, the clutch lever 4b serving as a clutch manual operator is attached to a base end side (an inner side in the vehicle width direction) of a left grip of the steering handle 4a. The clutch lever 4b functions as an operator configured to transmit a clutch operation requirement signal to the ECU 60 with no mechanical connection to the clutch device 26 using a cable, a hydraulic pressure, or the like. That is, the motorcycle 1 employs a clutch-by-wire system configured to electrically connect the clutch lever 4b and the clutch device 26.

Referring also to FIG. 4, a clutch lever operation amount sensor 4c configured to detect an operation amount (a pivot angle) of the clutch lever 4b is installed integrally with the clutch lever 4b. The clutch lever operation amount sensor 4c converts an operation amount of the clutch lever 4b into an electrical signal and outputs the converted electrical signal.

In a state in which an operation of the clutch lever 4b is effective (the manual system M2A), the ECU 60 drives the clutch actuator 50 based on the output of the clutch lever operation amount sensor 4c. Further, the clutch lever 4b and the clutch lever operation amount sensor 4c may be integrated with each other or may be separate from each other.

The motorcycle 1 includes the clutch control mode selection switch 59 configured to switch a control mode of a clutch operation. Under a predetermined condition, the clutch control mode selection switch 59 can arbitrarily perform switching between the automatic mode M1 of automatically performing clutch control and the manual mode M2 of manually performing clutch control according to an operation of the clutch lever 4b. For example, the clutch control mode selection switch 59 is installed on a handle switch attached to the steering handle 4a. Accordingly, an occupant can easily operate the clutch control mode selection switch 59 in normal driving.

<Control of Clutch Capacity>

The clutch control device 60A of the embodiment calculates a control target value of a clutch capacity (hereinafter, simply referred to as "a control target value"). The clutch control device 60A determines whether an engine rotational number after downshifting by the gearbox 21 enters a high rotation region and decreases a clutch capacity after downshifting when it is determined that the engine rotational number after downshifting enters the high rotation region.

Here, the high rotation region is a region in which a rotational number of the engine is relatively high. That is, the high rotation region corresponds to a region in which a rotational number of the engine is close to a limit, a so-called red zone.

The clutch control device 60A of the embodiment performs control of decreasing a clutch capacity after downshifting when it is expected that the engine rotational number after downshifting enters or exceeds the red zone. That is, the clutch control device 60A performs control of preventing the clutch capacity after downshifting from entering or exceeding the red zone.

Next, an example of processing performed by the ECU 60 upon control of the clutch capacity will be described with reference to a flowchart of FIG. 7. The control flow is repeatedly performed at a prescribed control period (1 to 10 msec) when the automatic mode M1 is selected.

Figure 7:
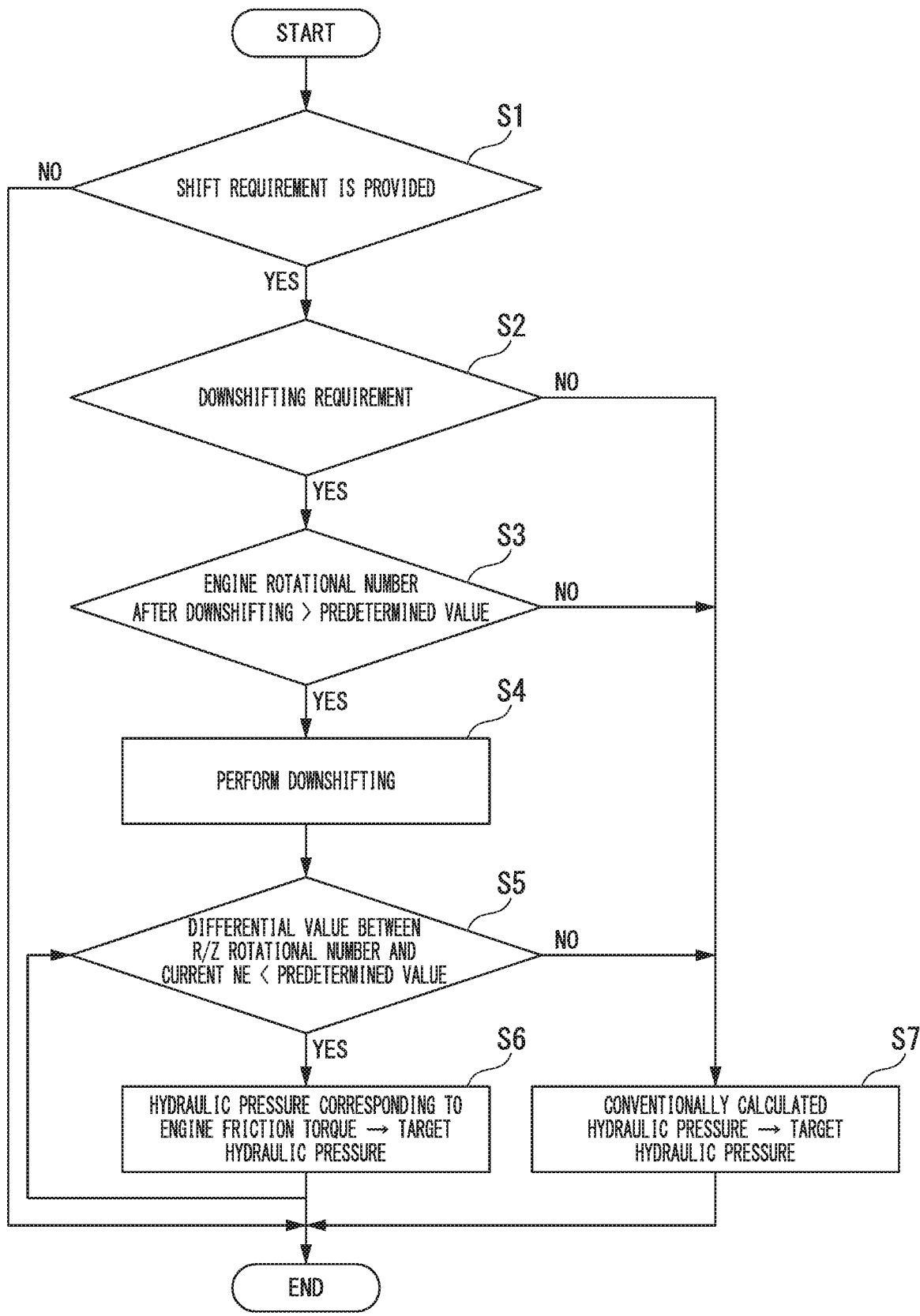
FIG. 7 is a flowchart showing control of a clutch capacity according to the embodiment.

As shown in FIG. 7, the ECU 60 determines whether there is a shift requirement (step S1). Here, the shift requirement is a requirement of a shift change, and determined according to an operation of the shift pedal 32 (see FIG. 1). The shift change includes upshifting and downshifting.

In the case of YES (there is a shift requirement) in step S1, the processing is shifted to step S2. In the embodiment, when the shift pedal 32 is operated, the processing is shifted to step S2.

Meanwhile, in the case of NO (there is no shift requirement) in step S1, the processing is terminated.

In step S2, the ECU 60 determines whether there is a downshifting requirement.

In the case of YES (there is a downshifting requirement) in step S2, the processing is shifted to step S3. In the embodiment, when the downshifting is performed by the operation of the shift pedal 32, the processing is shifted to step S3.

Meanwhile, in the case of NO (there is no downshifting requirement, i.e., there is an upshifting requirement) in step S2, the processing is shifted to step S7. In the embodiment, when the upshifting is performed by the operation of the shift pedal 32, the processing is shifted to step S7.

In step S3, the ECU 60 determines whether the engine rotational number after downshifting exceeds a predetermined value (hereinafter, also referred to as "a red zone rotational number"). That is, in step S3, it is expected whether the engine rotational number after downshifting exceeds a red zone rotational number (hereinafter, also referred to as "an R/Z rotational number").

Here, the engine rotational number after downshifting (hereinafter, also referred to as "an NE after downshifting") is a clutch downstream rotational number at a gear ratio (a target gear ratio) after downshifting (a counter shaft rotational number of crank shaft conversion). A counter shaft rotational number Xc of crank shaft conversion is calculated by the following equation (1).

$$Xc = Rc \times Gr \times Pr \quad (1)$$

In the above-mentioned equation (1), Rc represents a rotational number of the counter shaft 23, Gr represents a gear ratio (a speed reduction ratio from the main shaft 22 to the counter shaft 23), and Pr represents a primary ratio (a speed reduction ratio from the crankshaft 14 to the main shaft 22) (see FIG. 1 and FIG. 2).

In the case of YES (the NE after downshifting exceeds an R/Z rotational number) in step S3, the processing is shifted to step S4.

Meanwhile, in the case of NO (the NE after downshifting is an R/Z rotational number or less) in step S3, the processing is shifted to step S7. That is, when the NE after downshifting does not reach the red zone even after downshifting, the processing is shifted to step S7.

In step S4, downshifting is performed by a driver. That is, the downshifting is performed by an operation of the shift pedal 32. After step S4, the processing is shifted to step S5.

In step S5, the ECU 60 determines whether a differential value between the R/Z rotational number (the threshold value of the high rotation region) and the current NE (the current engine rotational number) is smaller than a predetermined value (hereinafter, also referred to as "a rotational number threshold value"). For example, the rotational number threshold value is set to 500 [rpm].

In the case of YES (the differential value is less than the rotational number threshold value) in step S5, the processing is shifted to step S6.

That is, when the current engine rotational number approaches the R/Z rotational number, the processing is shifted to step S6.

Meanwhile, in the case of NO (the differential value exceeds the rotational number threshold value) in step S5, the processing is shifted to step S7. That is, when there is a margin in the current engine rotational number, the processing is shifted to step S7.

In step S6, the ECU 60 sets a hydraulic pressure corresponding to an engine friction torque as a target hydraulic pressure. Here, the hydraulic pressure corresponding to the engine friction torque means a hydraulic pressure that becomes a clutch capacity corresponding to an engine friction torque. In step S6, the ECU 60 sets a clutch capacity such that a torque corresponding to a friction torque of the engine is transmitted.

Here, the case in which the engine rotational number is smaller than a rotational number of the rear wheel is assumed.

Figure 8:
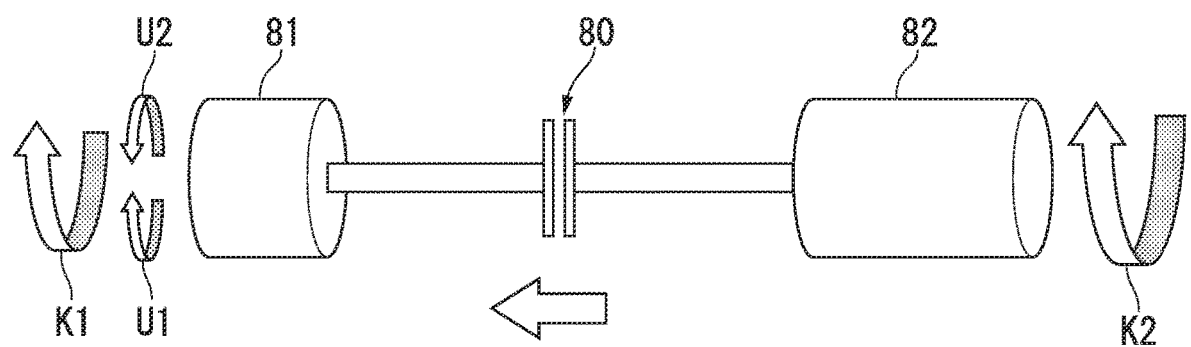
FIG. 8 is a schematic view for illustrating clutch connection.

FIG. 8 is a schematic view for illustrating clutch connection. In FIG. 8, reference numeral 80 designates a clutch, reference numeral 81 designates a clutch upstream inertia mass (an engine-side member), and reference numeral 82 designates a clutch downstream inertia mass (a rear wheel-side member).

As shown in FIG. 8, when the engine rotational number is smaller than a rotational number of the rear wheel, the engine side is rotated from the rear wheel side by clutch connection. In FIG. 8, an arrow K1 indicates a rotational direction of the engine, and an arrow K2 indicates a rotational direction of the rear wheel.

When maintaining the rotation of the engine, it will be sufficient if a force trying to rotate the engine (a clutch transmission torque from the rear wheel) and a force trying to stop the engine (an engine friction torque) is balanced. That is, by controlling the clutch transmission torque substantially same to the engine friction torque, the engine rotational number can be constantly held. In FIG. 8, an arrow U1 indicates a direction in which a clutch transmission torque is applied, and an arrow U2 indicates a direction in which an engine friction is applied.

A clutch transmission torque Xt is calculated by the following equation (2).

$$Xt = Ds \times Dr \times Fk \times Ps \times Sp \qquad (2)$$

In the above-mentioned equation (2), Ds designates a clutch disk surface number, Dr designates a clutch disk effective radius, Fk designates a coefficient of friction, Ps designates a slave hydraulic pressure, and Sp designates a clutch piston area. In the above-mentioned equation (2), the clutch disk surface number Ds, the clutch disk effective radius Dr, the coefficient of friction Fk and the clutch piston area Sp are coefficients. According to the above-mentioned equation (2), a slave hydraulic pressure Ps (the hydraulic pressure substantially same to the engine friction torque) is uniquely determined if the clutch torque (the clutch transmission torque Xt) to be transmitted is known.

Here, the engine friction torque (hereinafter, also referred to as "an engine estimation torque") is an engine torque corresponding to the engine rotational number and the throttle opening angle, and is calculated from an engine estimation torque map (see FIG. 9). For example, the engine estimation torque map is created on the basis of actually measured values of the engine rotational number and the throttle opening angle. The engine estimation torque map is previously stored in the storage 62 (see FIG. 4).

FIG. 9 shows an example of the engine estimation torque map according to the embodiment. In the map of FIG. 9, a vertical axis represents a throttle opening angle of t1 to t10 [%], and a lateral axis represents an engine rotational number of r1 to r10 [rpm]. In the map of FIG. 9, q1 to q10 represent an engine estimation torque [Nm] (hereinafter, also referred to as "a torque value"), and the case in which the torque value is negative (−) (a hatching portion in the map of FIG. 9) represents a speed reduction state (i.e., an engine brake state).

As shown in FIG. 9, the engine estimation torque tends to increase as the throttle opening angle is increased. A region in a speed reduction state (a region in which a torque value is negative) tends to gradually widen as the engine rotational number is increased.

The ECU 60 calculates an engine estimation torque by applying the engine rotational number and the throttle opening angle to an engine estimation torque map. For example, in FIG. 9, when the engine rotational number is r5 and the throttle opening angle is t1 (for example, in a throttle full-open state), the engine estimation torque is calculated as −q5.

In step S6, the ECU 60 sets a target hydraulic pressure on the basis of the engine estimation torque map and the above-mentioned equation (2). In step S6, the slave hydraulic pressure Ps is calculated by applying the engine estimation torque calculated by the engine torque map to the above-mentioned equation (2) as the clutch transmission torque Xt, and the calculated slave hydraulic pressure Ps (the hydraulic pressure substantially same to the engine friction) is set as the target hydraulic pressure.

Further, after step S6, the processing may be returned to step S5. That is, when the current engine rotational number approaches the R/Z rotational number, step S5 and step S6 may be repeatedly performed.

Meanwhile, in step S7, a normally calculated hydraulic pressure (a hydraulic pressure calculated at normal time) is set as a target hydraulic pressure.

As described above, the embodiment is the clutch control device 60A including the engine 13, the gearbox 21, the clutch device 26 configured to disconnect and connect power transmission between the engine 13 and the gearbox 21, the clutch actuator 50 configured to drive the clutch device 26 and vary a clutch capacity, and the ECU 60 configured to calculate a control target value of the clutch capacity, and the ECU 60 determines whether an engine rotational number after downshifting by the gearbox 21 enters a high rotation region and decreases the clutch capacity after downshifting when it is determined that the engine rotational number after downshifting enters the high rotation region.

According to the configuration, it is possible to suppress the engine rotational number to enter or going beyond a red zone even after the downshifting is performed by decreasing a clutch capacity after downshifting when it is determined that the engine rotational number after downshifting enters the high rotation region. In addition, even when it is determined that the engine rotational number after downshifting enters the high rotation region, since the control of not allowing execution of downshifting is not performed, a driver can perform the downshifting at a desired timing. Accordingly, the downshifting can be performed at a desired timing while preventing over revolution after the downshifting.

In addition, in the embodiment, when the ECU 60 determines that a differential value between the threshold value of the high rotation region and the engine rotational number enters the predetermined value range, it is possible to suppress the engine rotational number after downshifting from entering or exceeding the red zone by decreasing a clutch capacity after downshifting.

In addition, in the embodiment, since the ECU 60 sets a clutch capacity such that a torque substantially same to a friction torque of the engine is transmitted, an appropriate traveling feeling can be experienced without causing a driver to experience an idling running feeling.

In addition, in the embodiment, a transmission delay of a driving force between the clutch actuator and the clutch device due to a resistance to flow (pressure loss) of a hydraulic pressure can be minimized since the clutch capacity is controlled with a hydraulic pressure.

Figure 10A:
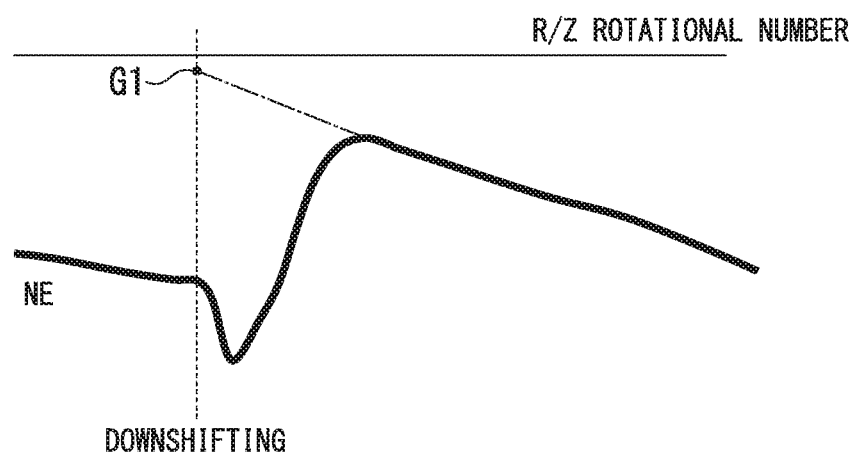
FIG. 10A is a view of a comparative example for illustrating an example of control of the clutch capacity according to the embodiment.

For example, as shown in FIG. 10A, when downshifting control is allowed only when the engine rotational number (NE) upon downshifting is the R/Z rotational number or less (for example, when it is at a point G1 in FIG. 10A), it is difficult to maintain the engine rotational number close to the R/Z rotational number after downshifting.

Figure 10B:
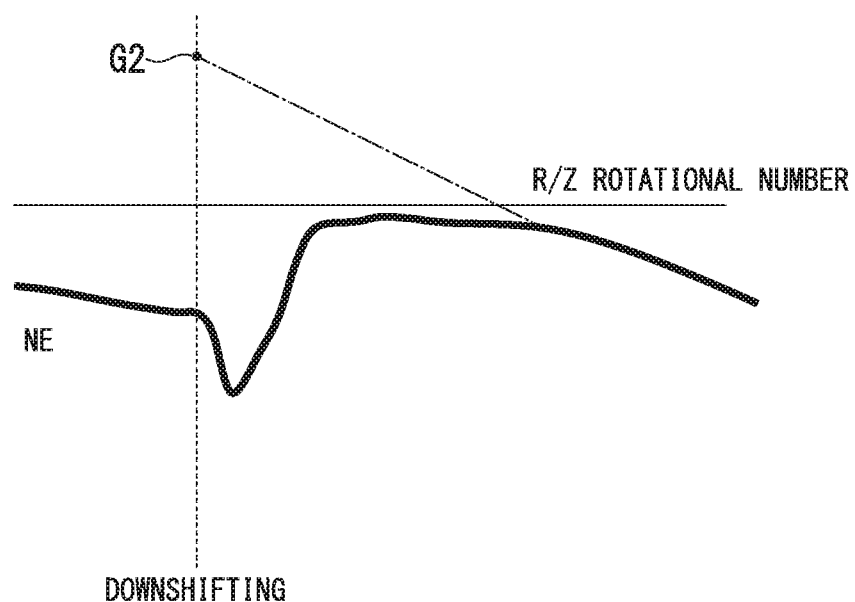
FIG. 10B is view of an embodiment for illustrating an example of control of the clutch capacity according to the embodiment.

On the other hand, according to the embodiment, as shown in FIG. 10B, it is possible to allow downshifting control even when the engine rotational number (NE) is the R/Z rotational number or more (for example, at a point G2 in FIG. 10B) and to decrease the clutch capacity when the engine rotational number (NE) has approached the R/Z rotational number. That is, according to the embodiment, since the engine rotational number after downshifting can be held close to the R/Z rotational number (a power band region that is an optimal engine rotational region), the engine power can be maximally exhibited while protecting the engine by minimizing an increase in engine rotational number. In other words, the vehicle can travel in the power band region without excessive consciousness of the engine rotational number.

Further, the present invention is not limited to the embodiment, and for example, the present invention may be applied to a configuration in which a clutch is disconnected by increasing a hydraulic pressure and the clutch is connected by decreasing a hydraulic pressure, in addition to a configuration in which a clutch is connected by increasing a hydraulic pressure and the clutch is disconnected by decreasing the hydraulic pressure.

The clutch operator is not limited to the clutch lever and may be a clutch pedal or other various operators.

The present invention is not limited to a saddle riding vehicle in which a clutch operation is automated like the embodiment and may also be applied to a saddle riding vehicle including a so-called transmission with no clutch operation configured to adjust a driving force and shift gears without performing a manual clutch operation under a predetermined condition while setting the manual clutch operation as a basic operation.

In addition, all vehicles on which a driver rides on the vehicle body are included as the saddle riding vehicle, and in addition to a motorcycle (including a motorized bicycle and a scooter-type vehicle), a three-wheeled vehicle (including a two-front-wheeled and one-rear-wheeled vehicle in addition to one-front-wheeled and two-rear-wheeled vehicle) or a four-wheeled vehicle may also be included, and a vehicle in which an electric motor is included in a prime mover may also be included.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A clutch control device comprising:
   an engine;
   a gearbox;
   a clutch device configured to disconnect and connect power transmission between the engine and the gearbox;
   a clutch actuator configured to drive the clutch device and vary a clutch capacity; and
   a controller configured to calculate a control target value of the clutch capacity,
   wherein the controller determines whether an engine rotational number after downshifting by the gearbox enters a high rotation region before the downshifting is performed, and decreases the clutch capacity after downshifting when it is determined that the engine rotational number after downshifting enters the high rotation region.

2. The clutch control device according to claim 1,
   wherein the controller determines whether a differential value between a threshold value of the high rotation region and the engine rotational number enters a predetermined value range, and decreases the clutch capacity after downshifting when it is determined that the differential value enters the predetermined value range.

3. The clutch control device according to claim 2,
   wherein the controller sets the clutch capacity such that a torque substantially the same as a friction torque of the engine is transmitted.

4. The clutch control device according to claim 3,
   wherein the clutch capacity is decreased and the clutch device is disconnected as a hydraulic pressure is lowered.

5. The clutch control device according to claim 1,
   wherein the controller sets the clutch capacity such that a torque substantially the same as a friction torque of the engine is transmitted.

6. The clutch control device according to claim 1,
   wherein the clutch capacity is controlled with a hydraulic pressure.

\* \* \* \* \*